(12) United States Patent
Staltmayer et al.

(10) Patent No.: US 6,189,963 B1
(45) Date of Patent: Feb. 20, 2001

(54) GUIDE CRANK

(75) Inventors: Thomas Staltmayer, Gauting; Roland Wittal, Müchen; Günther Schwanitz, Weilehim, all of (DE)

(73) Assignee: Webasto Karosseriesysteme GmbH, Stockdorf (DE)

(*) Notice: Under 35 U.S.C. 154(b), the term of this patent shall be extended for 0 days.

(21) Appl. No.: 09/303,541

(22) Filed: May 3, 1999

(51) Int. Cl.$^7$ .................................................. B60J 7/05
(52) U.S. Cl. ................................. 296/223; 296/221
(58) Field of Search ............................... 296/223, 221

(56) References Cited

U.S. PATENT DOCUMENTS

| | | | |
|---|---|---|---|
| 4,427,085 | * 1/1984 | Ochiai et al. | 296/223 |
| 4,725,092 | 2/1988 | Reintges et al. | 296/221 |
| 5,066,068 | * 11/1991 | Suzuki et al. | 296/223 X |
| 5,593,204 | 1/1997 | Wahl et al. | 296/223 |

FOREIGN PATENT DOCUMENTS

| | | | |
|---|---|---|---|
| 3919385 | * 7/1990 | (DE) | 296/223 |
| 2 314 050 | 12/1997 | (GB) . | |

\* cited by examiner

Primary Examiner—Dennis H. Pedder
(74) Attorney, Agent, or Firm—Nixon Peabody LLP; David S. Safran

(57) ABSTRACT

A guide crank for the cover of an openable motor vehicle roof comprises a crank body connected to the cover and including at least one slotted opening. The opening itself either forms a guideway or is used as the receiver of a guide body which has a guideway. At least one stiffening element is provided for bridging the opening at least in one partial area and joining the material areas of the crank body to one another on either side of the opening. The stiffening element makes the guide crank economical with high stiffness and with low material thickness and narrow crosspieces above and below the opening.

15 Claims, 5 Drawing Sheets

GUIDE CRANK

BACKGROUND OF THE INVENTION

1. Field of the Invention

The invention relates to a guide crank for the cover of an openable motor vehicle roof with a crank body which is connected to the cover and which comprises at least one slotted opening, wherein the opening forms a guideway or is used as the receiver of a guide body which has the guideway.

2. Description of Related Art

One such guide crank is known, for example, from German patent applications DE 35 29 118 C2 or DE 196 23 945 C1. The guideway of the guide crank is used for movable accommodation of a crank pin of a cover actuation mechanism for swivelling and/or moving the cover in the lengthwise direction of the motor vehicle. The crank body of a generic guide crank must have sufficient stiffness and torsional resistance so that the cover does not tend to vibrate under vertical loads, as are caused among others by wind load. The crank should not plasticly deform even under an overload which occurs, for example, when the cover actuation mechanism is actuated with the cover frozen to a vehicle-mounted frame. In this case guide cranks with very long guideways are especially critical. These guide cranks are used in cover actuation mechanisms in which the crank pin is attached directly to a slide piece of a guide rail which runs in the displacement direction of the cover. However, the crank body of a guide crank with a shorter guideway is also somewhat weakened by the slotted opening. A shorter guideway is typically used when the crank pin is attached to a raising lever which is swivel mounted on the slide piece of the guide rail.

Guide cranks of the aforementioned type are therefore made frequently as a relatively thick sheet metal part which, in addition, can have bends. In particular, above or below the opening, relatively high crosspieces must remain in order to prevent plastic deformation of the guideway under load, and to minimize elastic deformation and the tendency to vibration. This results in the fact that generic guide cranks, having a guide body consisting of a sheet metal part, have considerable weight and require a large installation height. If the crank body of the guide cranks of the above mentioned type is made of plastic, it must be made thicker for reasons of strength thereby taking up even more installation height.

These fundamental disadvantages also afflict cranks with crank bodies made as a composite which, for example, has a layered structure consisting of an inner plastic body and preferably two side metal bodies as shown in German patent application DE-44 05 742 C1.

SUMMARY OF THE INVENTION

The object of the present invention is to devise a crank which is characterized by high strength, but which has smaller material thickness and narrow crosspieces above and below the opening relative to conventional cranks, and which can be produced economically without high production cost.

The object is achieved by providing a guide crank having at least one stiffening element which bridges an opening, at least in one partial area, and which joins the material areas of the crank body to one another on either side of the opening. Thus it is possible to make the crank body thin-walled and with narrow crosspieces on either side of the opening. The stiffening elements reinforce the crank body by reducing the free elastic length of the opening. The stiffening elements can be purposefully located at high load points without increasing the construction height. Reliable operation of the crank is greatly improved even in overloaded operation. The guide crank is suited for use in all types of openable motor vehicle roofs such as sliding roofs, lifting roofs, sliding/lifting roofs or louvered roofs. The cover can be a one-part or multipart cover.

Preferably the stiffening element is made U-shaped and is joined by force-fit and/or form-fit to the crank body. It can be formed by a sheet metal strip which is bent in a U-shape and which is locked and/or riveted to the crank body. The sheet metal strip can extend over almost the entire length of the guideway. The stiffening element can be constructed very simply as a metal body bent in a U-shape with a circular cross section which is caulked or wobbled in the receiving holes of the crank body; the crank body likewise feasibly consisting of metal.

In another embodiment of the invention, the stiffening element can be joined by material-fit to the crank body or can be made as one piece with the body. The one-piece version is especially well suited in a crank body of plastic in which at least one stiffening element is molded on at the same time during the molding process of the body.

In terms of production engineering, the stiffening element can also be made as an essentially U-shaped plastic extrusion coating of the crank body, with great freedom in shaping, and the stiffening element can be optimized in terms of strength and space. If the guideway is not formed by the opening of the crank body itself, but by a plastic guide body which is located in the opening of the crank body, it is a good idea to make the guide body and at least one stiffening element in one piece and mold them jointly onto the crank body.

The stiffening element advantageously prestresses the material areas on either side of the opening in an elastic manner in the direction towards one another so that the walls of the guideway are easily prestressed in the transverse direction. A guide pin, which is movably held, adjoins the walls without play. Preferably, the stiffening elements span an area of the opening of the crank body in which there is a section of the guideway which corresponds to the passage from one closed position of the cover to a ventilation position with the rear edge of the cover raised over the solid roof covering of the motor vehicle. Furthermore, a stiffening element feasibly strengthens the opening in a section of the guideway which corresponds to the ventilation position. This ensures that the guide crank is made especially stiff in the cover positions in which overloaded operation can often occur.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENT

Figure 1:
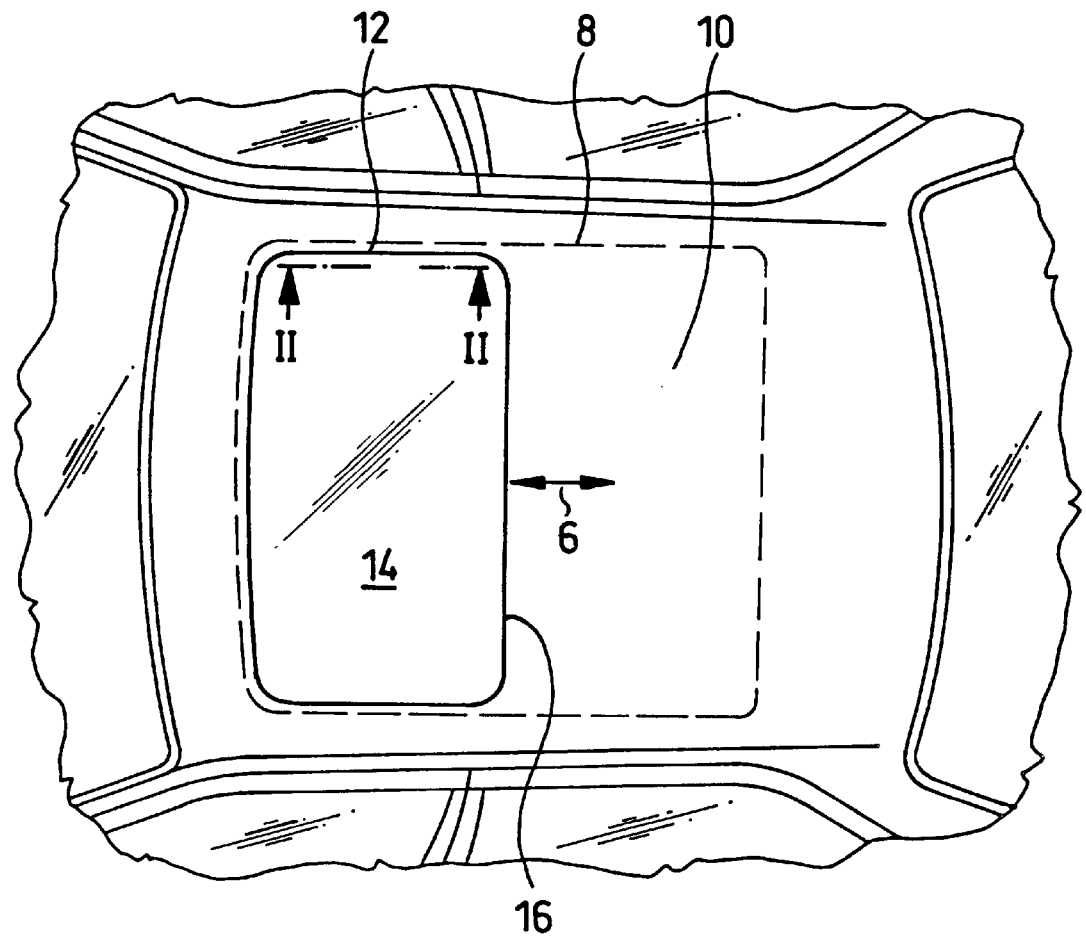
FIG. 1 shows a schematic overhead view of a motor vehicle roof.

As shown in FIG. 1, in the solid roof covering 10 of a motor vehicle, there is a roof opening 12 which can be selectively closed or completely or partially cleared by a cover 14. The cover 14 is driven by a cover actuating mechanism of a conventional type which is supported on a frame 8 and which is used to raise or lower a rear edge 16 of the cover 14 and to move the cover in a displacement direction 6.

Figure 2:
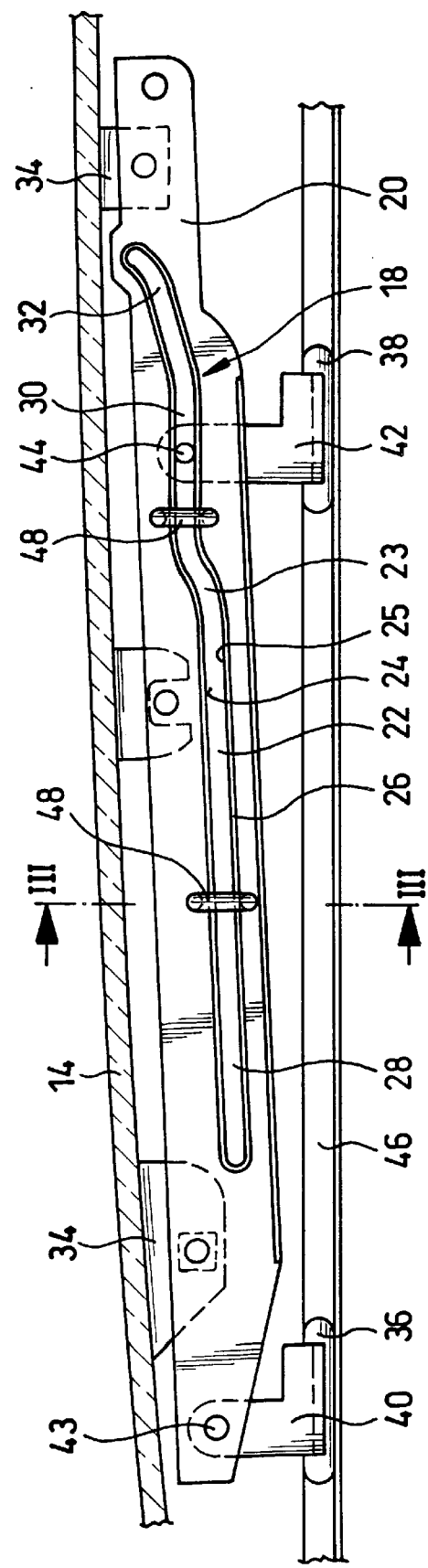
FIG. 2 shows a partial section along the line II—II of FIG. 1.
Figure 3:
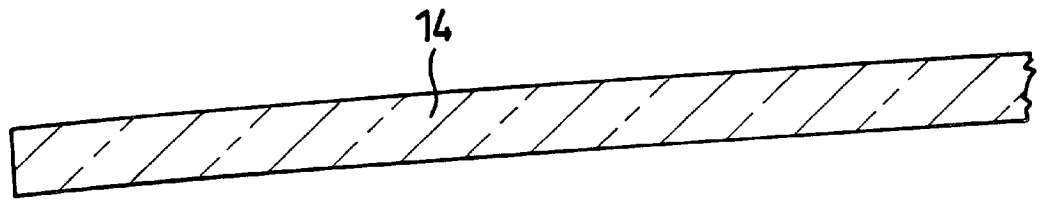
FIG. 3 shows a partial section along line III—III of FIG. 2.
Figure 3:
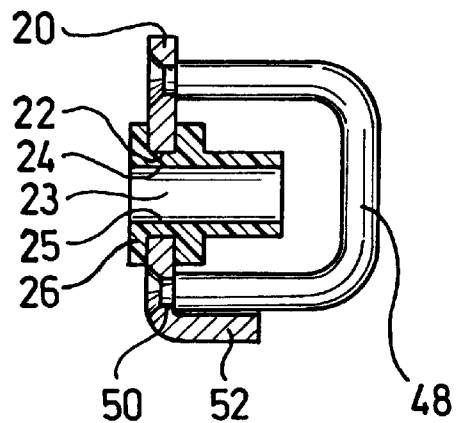

With reference to FIGS. 2 and 3, a guide crank 18 is shown which has an elongated metal crank body 20 with a slotted opening 22 which runs essentially in the longitudinal direction of the crank body. Retaining pieces 34 are used to attach the crank body 20 to the cover 14. In the opening 22 of the crank body 20, a plastic guide body 26 is molded which has a guideway 23 formed by a top and a bottom wall 24, 25 respectively. The walls 24 and 25 run at a distance corresponding to the thickness of a crank pin 44 which is movably guided between the walls. On one front end, the crank body is articulated via a pin 43 to a crosspiece 40 of a front sliding piece 36. The front sliding piece 36 is movably held in a guide rail 46 which runs in the displacement direction 6 of the cover.

The crank pin 44 is carried by a crosspiece 42 of a rear sliding piece 38 which is likewise movably supported along the guide rail 46. The rear sliding piece 38 is part of the cover actuation mechanism and is moved in the conventional manner by a drive (not shown) via compressively stiff cables in the displacement direction 6. The crank pin 44 is pushed along the guideway 23 depending on the distance of the two sliding pieces 36 and 38. In this way, the lengthwise motion of the rear sliding piece 38 is transformed into rotary motion of the cover 14 around the longitudinal axis of the pin 43. If the crank pin 44 is located in a front section 28 of the guideway 23, the rear cover edge 16 is raised over the solid roof covering 10. If the crank pin 44, as shown in FIG. 2, occupies a center section 30 of the guideway 23, the cover 14 is in the closed position. If the crank pin 44 is ultimately in a rear section 32, the rear edge 16 of the cover 14 is swivelled under the solid roof covering 10 so that the cover 14 can be moved in the displacement direction 6 by displacing the two sliding pieces 36 and 38.

The crank body 20 has an L-shaped cross section with a bevel 52 and is provided with two stiffening elements 48 which divide the opening 22 in the displacement direction 6 into three segments of roughly the same length and which connect the material areas above and below the opening 22 to one another. The stiffening elements 48 are formed by a U-shaped steel round with arms which each have a shoulder on the end side which is inserted into a hole 50 of the crank body 20 and joined by force-fit and form-fit to the crank body in the form of a countersunk head rivet connection.

Figure 4:
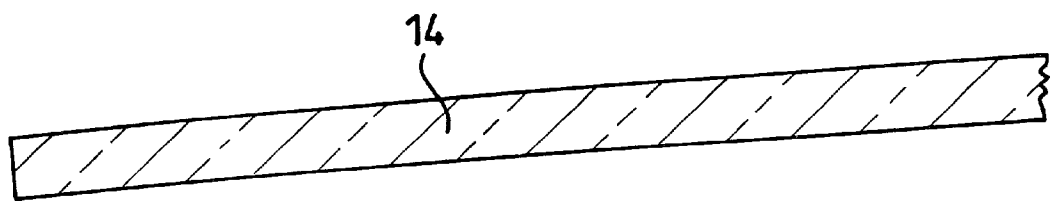
FIG. 4 shows a partial section similar to FIG. 3 for a stiffening element according to one modified embodiment.
Figure 4:
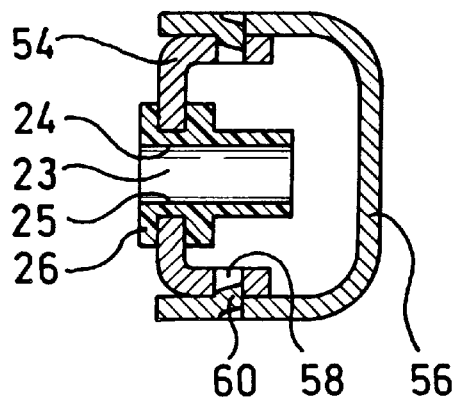

In the embodiment shown in FIG. 4, the stiffening element is made as a U-shaped spring clip 56 with arms which surround a likewise U-shaped crank body 54. Each arm of the spring clip 56 has perforated catch clips 60 which form-fit into the receivers 58 of the crank body 54. The arms of the spring clip 56 are prestressed in the direction towards one another in order to ensure reliable contact with the crank body 54 and, at the same time, to slightly elastically compress the top and bottom wall 24 and 25, respectively, of the guide body 26 so that the crank pin 44 follows the guideway 23 without play. Spring clip 56 may be made from a sheet metal strip or a plastic extrusion coating.

Figure 5:
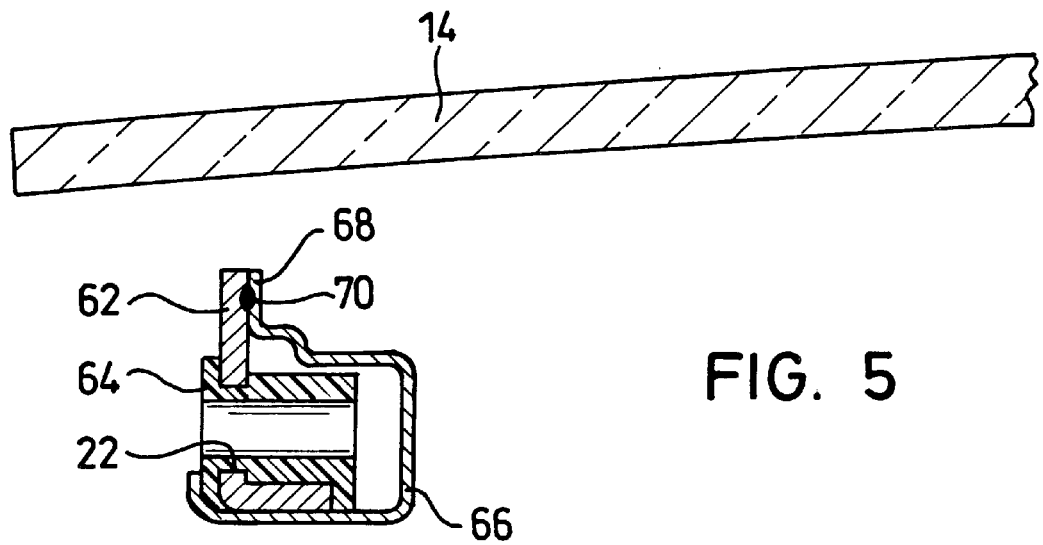
FIGS. 5 to 6 show partial sections similar to FIG. 3 for other embodiments of the stiffening element.

The embodiment shown in FIG. 5 shows an essentially U-shaped stiffening element likewise made as a spring clip 66 and also an L-shaped crank body 62 with a plastic guide body 64 molded into its opening 22. The lower arm of the spring clip 66 surrounds the short arm of the crank body 62 by form-fit. Conversely, a projection 68 is molded to the top arm of the spring clip 66 and is connected via welds 70 to the long arm of the crank body 62. The spring clip 66 extends over almost the entire length of the guideway in the longitudinal direction of the crank body 62.

Figure 6:
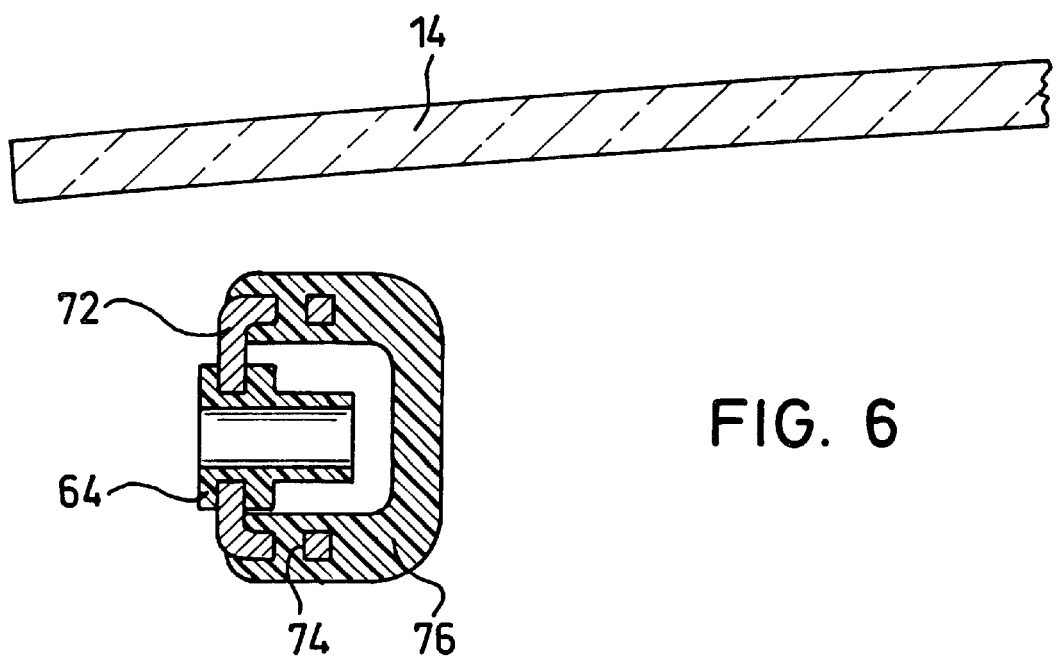
Figure 7:
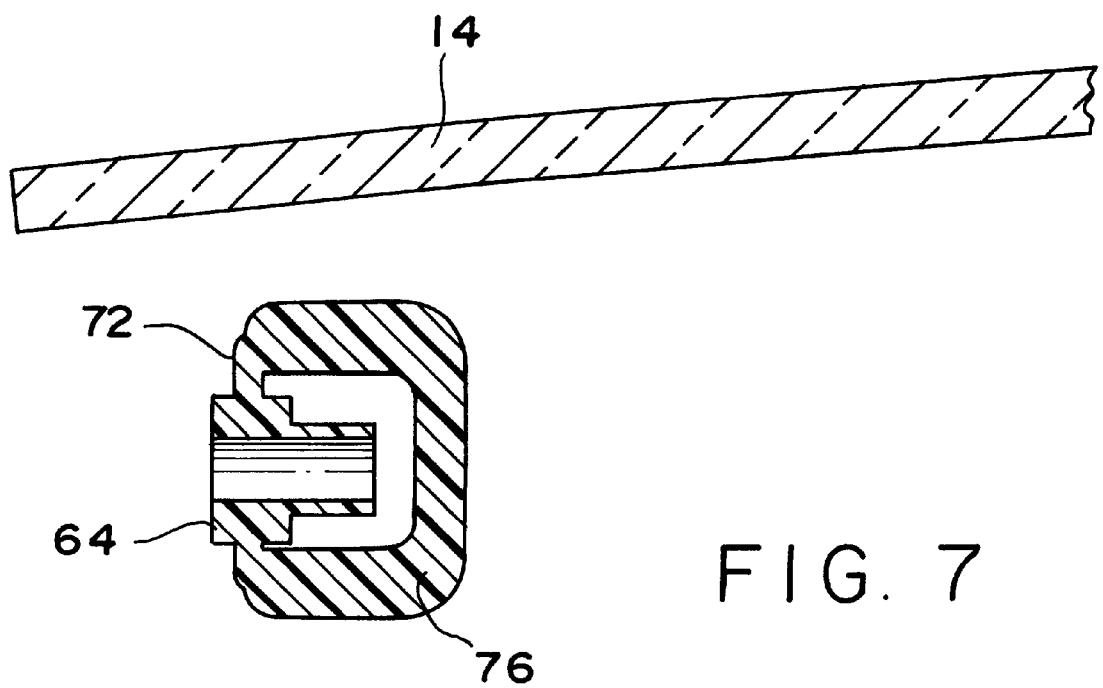
FIG. 7 shows a modified version of the embodiment shown in FIG. 6 wherein the guide body, crank body and stiffening element are made in one-piece of plastic.

FIG. 6 shows an embodiment in which the stiffening element is a U-shaped plastic extrusion coating 76 which connects one top and one bottom arm of a likewise U-shaped crank body 72. Passages 74 in the arms of the crank body 72 are used for form-fitted connection of the plastic extrusion coating 76 to the crank body 72. The guide body 64 can be made as a separate component or can be optionally produced in one piece with the plastic extrusion coating 76 and the crank body 72 as shown in FIG. 7.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A guide crank for a cover of an openable motor vehicle roof, comprising:

a crank body connected to the cover, said crank body including at least one slotted opening, said opening at least one of forming a guideway and receiving a guide body having a guideway, further including at least one stiffening element which bridges said opening at least in one partial area and which joins material areas of the crank body to one another on either side of the opening; wherein said at least one stiffening element is U-shaped.

2. The guide crank of claim 1, wherein said at least one stiffening element is joined to the crank body by at least one of an interlocking engagement, shaped-to-match retention and a force-fit.

3. The guide crank of claim 1, wherein said at least one stiffening element is made in one piece with the crank body.

4. The guide crank of claim 1, wherein the crank body is made as a sheet metal part.

5. The guide crank of claim 1, wherein said at least one stiffening element spans an area of the opening in which there is a section of the guideway which corresponds to a passage from one closed position of the cover to a ventilation position with a rear edge of the cover raised over a solid roof covering of the motor vehicle.

6. The guide crank of claim 1, wherein said at least one stiffening element reinforces the opening in a segment of the guideway which corresponds to a ventilation position.

7. The guide crank of claim 1, wherein said at least one stiffening element is formed by an essentially U-shaped plastic extrusion coating connected to the crank body.

8. A guide crank for a cover of an openable motor vehicle roof, comprising:

a crank body connected to the cover, said crank body including at least one slotted opening, said opening at least one of forming a guideway and receiving a guide body having a guideway, further including at least one stiffening element which bridges said opening at least in one partial area and which joins material areas of the crank body to one another on either side of the opening;

wherein said at least one stiffening element elastically prestresses the material areas on either side of the opening in a direction towards one another.

9. The guide crank of claim 8, wherein said at least one stiffening element is joined to the crank body by at least one of an interlocking engagement, shaped-to-match retention and a force-fit.

10. The guide crank of claim 8, wherein said at least one stiffening element reinforces the opening in a segment of the guideway which corresponds to the ventilation position.

11. The guide crank of claim 8, wherein said at least one stiffening element is formed by an essentially U-shaped plastic extrusion coating connected to the crank body.

12. The guide crank of claim 8, wherein said at least one stiffening element spans an area of the opening in which there is a section of the guideway which corresponds to a passage from one closed position of the cover to a ventilation position with a rear edge of the cover raised over a solid roof covering of the motor vehicle.

13. The guide crank of claim 8, wherein the crank body is made as a sheet metal part.

14. A guide crank for a cover of an openable motor vehicle roof, comprising:

a crank body connected to the cover, said crank body including at least one slotted opening, said opening at least one of forming a guideway and receiving a guide body having a guideway, further including at least one stiffening element which bridges said opening at least in one partial area and which joins material areas of the crank body to one another on either side of the opening;

wherein said at least one stiffening element is formed by one of a sheet metal strip bent in a U-shape and a metal body bent in a U-shape with a circular cross section.

15. The guide crank of claim 14, wherein said at least one stiffening element is joined to the crank body by at least one of an interlocking engagement, shaped-to-match retention and a force-fit.

* * * * *